PEAK LIMITER

Filed April 14, 1967

INVENTORS
STANLEY CUTLER
SAVA W. JOCOBSON
BY Warren T. Jessup
ATTORNEY

3,509,373
PEAK LIMITER

Stanley Cutler, Sepulveda, and Sava W. Jacobson, Northridge, Calif., assignors to Warwick Electronics Inc., Chicago, Ill., a corporation of Delaware Filed Apr. 14, 1967, Ser. No. 631,001
Int. Cl. H03k 5/08
U.S. Cl. 307—237 3 Claims

ABSTRACT OF THE DISCLOSURE

A limiting circuit in a musical instrument amplifier includes a pair of parallel-connected, back-to-back diodes, shunted across a load point within the amplifier. When the tone signal amplitude exceeds the forward conduction voltage threshold of the diodes, the signal is shunted to ground. The threshold may be raised, if desired, by an adjustable back bias voltage. In series with each diode is a relatively low valued resistor, which retains some resistance in the shunting circuit even when the diodes go into full conduction. Thus, the voltage peak is not flattened off abruptly, but is given a rounding off which minimizes the generation of high-frequency noise into the circuit.

BACKGROUND OF THE INVENTION

In electronic musical instrument circuits the basic tone signal is subjected to the action of various types of format circuits—tremolos, vibratos, reverberation circuits, and the like—and is then applied through an amplifier to one or more loudspeakers. It is not unusual for the amplifier to be overdriven by a player or performer, i.e., the input amplitude exceeds that which the amplifier can handle without considerable distortion. This distortion takes the form of clipping wherein, after the amplitude of the output rises to a certain point in either polarity, it can go no further and the wave form becomes essentially flat-topped. This abrupt clipping of the wave, producing as it does sharp corners in the wave form, introduces undesirable output harmonics which are usually very high frequency. The amplifier is thus self-limiting, so that no harm is done to the circuit, but the resultant tone output is badly distorted.

Clipping circuits or peak limiters are known in the art. They serve to shunt current away from the output whenever the voltage exceeds a predetermined value. Such a clipping circuit, if placed in the system ahead of the amplifier, will prevent the amplifier from being overdriven, but the clipping circuit itself then introduces a sharp-cornered, flat-topped wave into the amplifier, which contains the same undesirable high harmonic distortion content that results when the amplifier itself does the clipping.

The present invention comprises a peak limiter which minimizes the generation of these deleterious high-frequency harmonics by rounding off the corners of the wave as it is limited or clipped.

SUMMARY OF THE INVENTION

A pair of oppositely poled, parallel-connected diodes are connected across a load point in an amplifier. They are reverse biased by an adjustable bias source, so that clipping can be caused to start at any desired voltage level. When a tone signal exceeds the established clipping level, the excess voltage is shunted to ground.

To round off the corners of the resulting flat-topped wave, a relatively low valued resistor is placed in series with each diode.

DESCRIPTION OF THE PREFERRED EMBODIMENT

Figures 1, 2:
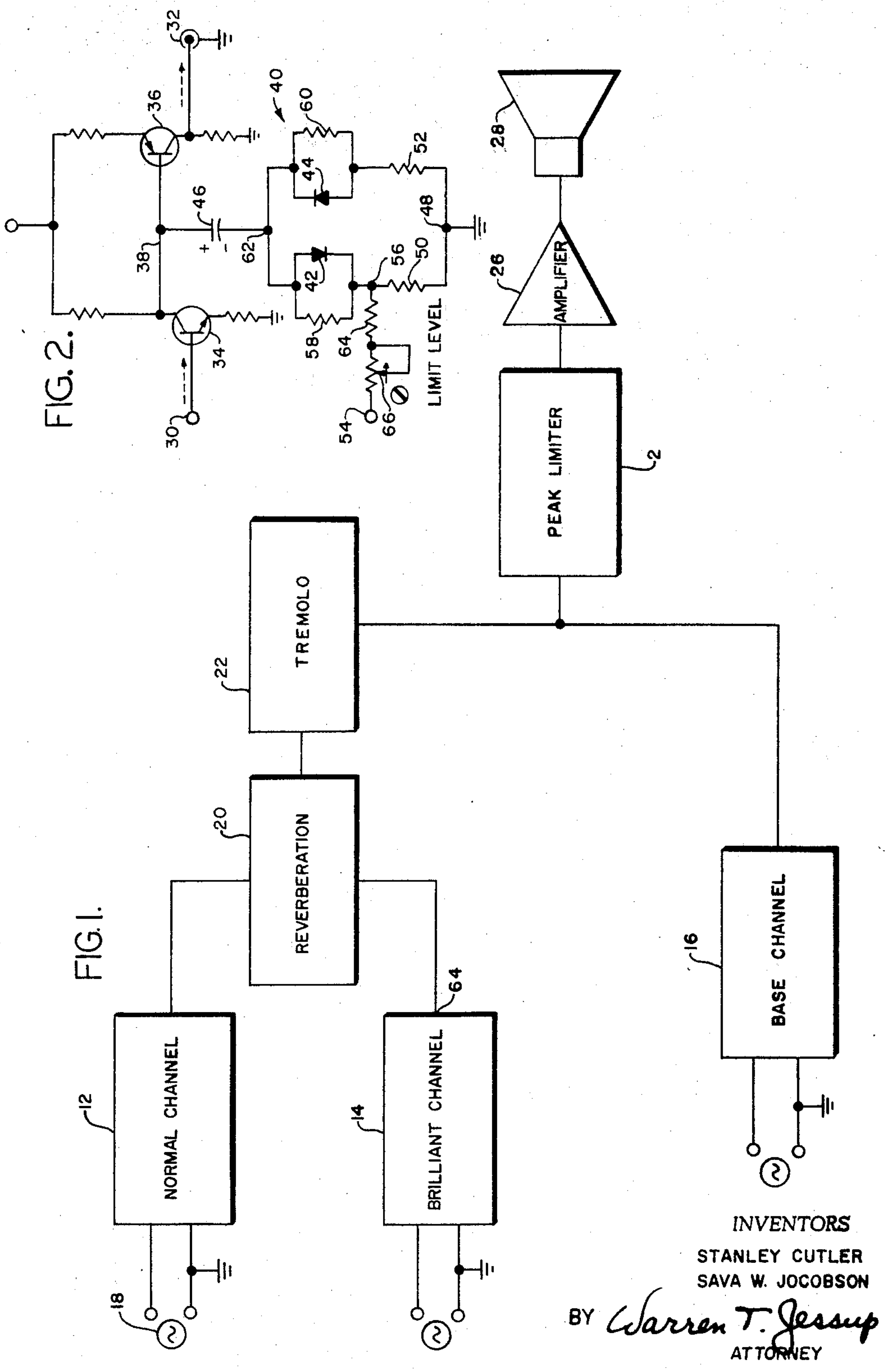
FIGURE 1 is a block diagram illustrating a typical musical instrument amplifier in which the peak limiter of the present invention has been incorporated.
FIGURE 2 is a wiring diagram of the peak limiter circuit.

In FIGURE 1 a musical instrument amplifier is shown having, by way of example three input channels, 12, 14, and 16. Musical instruments which produce a tone signal represented schematically at 18 may be applied to the input of the channels 12, 14, and 16. Typically channel 12 represents a normal channel, the output of which is applied, for example, to a reverberation circuit 20, thence to a tremolo circuit 22, and then to the input of the peak limiter 2, forming the subject matter of the present invention. The channel 14 represents a brilliant circuit, which tends to favor the high frequencies, and it leads to the same circuits as channel 12. The channel 16 represents a bass circuit which is applied directly to a peak limiter 2. All tone signals, as noted, are limited in the circuit of FIGURE 2, then supplied to an amplifier 26 and a loudspeaker 28. As indicated, the present invention resides in the circuit 2, illustrated in detail in FIGURE 2.

Referring to FIGURE 2, the peak limiter circuit of the present invention has an input terminal 30 and an output terminal 32. The input terminal is connected to an input stage of amplification represented by a transistor 34. The output terminal 32 is connected to an output stage of amplification represented by the transistor 36. The input stage 34 is directly coupled to the output stage 36 by a conductor 38.

In accordance with the present invention, a limiting circuit 40 is connected to the conductor 38 and serves to shunt excess signal to ground. The circuit 40 includes a pair of oppositely poled diodes 42 and 44 connected in parallel circuits and coupled to the conductor 38 by a coupling capacitor 46. Resistors 50 and 52 are connected respectively in series with the diodes 42 and 44 in order to soften the clipping action of the diodes, by rounding off the sharp corners of the waveform.

Without the resistors 50, 52, each diode, once the signal voltage reaches the threshold conduction point, presents virtually zero resistance to increased flow of current. The result would be a substantially flat-topped wave, with sharp corners at each end, where the clipping begins and ends. The resistors 50 and 52 put a rounded top on the waveform because even when the diodes 42, 44 are in full conduction, the resistors 50 and 52 still represent a significant although small resistance. This causes the voltage to rise slightly on the conductor 38 as the current increases. This round-topped wave, being free of the sharp corners, greatly reduces the very high-frequency components which would otherwise be injected into the system. These high frequencies are particularly disadvantageous in a musical instrument amplifier.

The diodes 42, 44 have a certain minimum forward voltage (threshold) required before they start to conduct. This in a typical case might be about 0.6 volt. Without more, therefore, the clipping action would start whenever the swing of the signal on the conductor 38, in either direction, exceeds 0.6 volt. In many cases it is desirable to have higher voltage levels pass through the peak limiter circuit of FIGURE 2. To this end an external bias is derived from the bias source 54, which places a reverse bias across the diodes 42 and 44.

A single bias source serves both diodes by being connected to the junction point 56 between the diode 42 and its corresponding resistor 50. This bias is distributed equally across the two diodes 42 and 44 by means of equal-valued shunt resistors 58 and 60, connected in parallel, respectively, with the diodes 42 and 44. The resistors 58, 60 are orders of magnitude greater than the resistors 50, 52.

The current flowing from the bias source 54 follows two parallel paths to ground from the junction point 56. One is directly through the resistor 50. The other is through the resistor 58, 60, and 52 back to the ground 48. Since the resistor 52 is insignificant in value, compared to 58 and 60, the bias at the point 56 substantially divides itself in two, so that a voltage of half of the value of the bias voltage at 56 appears at the junction point 62 between the upper ends of the two diodes 42, 44.

The bias is made adjustable by being applied to the point 56 from the source 54 through an isolating resistor 64 and a series connected adjustable resistor 66.

Let it be assumed by way of example that the resistor 66 is adjusted to cause 10 milliamperes to flow through the resistor 50. This produces a bias at the point 56 of one volt. Through the resistors 58, 60 a bias of one-half volt resides at the point 62. The diode 42 is thus reverse biased by the difference existing between the one-volt bias at 56 and the one-half volt bias at 62, namely a reverse bias of one-half volt. The diode 44 is reverse biased by the difference in voltage at 62 (one-half volt) and the ground point 48, i.e., a reverse bias of also one-half volt. Thus, both diodes 42 and 44 are reverse biased by the same amount, and will thus respond equally to both half cycles of the alternating signal voltage appearing on the conductor 38.

The capacitor 46 is of sufficiently low reactance at the frequencies which are involved here that for signal currents it represents virtually a short circuit and is thus simply a DC isolating capacitor.

It will be readily understood that the diodes 42, 44 are merely typical representatives of unidirectional conducting devices which present relatively high resistance to passage of current in one polarity and relatively low resistance to passage of current in the other polarity. By the term "diode" as used in this specification and in the following claims, there is intended any such unidirectional conducting device. It is preferred to employ a relatively high current, large geometry type of diode, as indicated specifically below.

A satisfactory circuit has been constructed in accordance with the diagram FIGURE 2, having the following parameters.

| | |
|---|---|
| Transistors: | |
| 34 | 2N3900A |
| 36 | MPS6517 |
| Capacitor 46, microfarads | 10 |
| Resistors 58, 60, ohms | 47,000 |
| Diodes 42, 44 | 1N4002 |
| Resistors 50, 52, ohms | 100 |
| Variable resistor 66, ohms | 10,000 |
| Resistor 64, ohms | 1,000 |
| Source 54, volts DC | 25 |

Whereas the present invention has been shown and described herein in what is conceived to be the best mode contemplated, it is recognized that departures may be made therefrom within the scope of the invention, which is, therefore, not to be limited to the details disclosed herein, but is to be afforded the full scope of the invention as hereinafter claimed.

What is claimed is:

1. Peak limiter adapted to be interposed in a circuit between an audio signal source and an electro-acoustic transducer and comprising:
   - input circuit means,
   - output circuit means connected to said input circuit means,
   - limiter circuit means for shunting tone signals from said input circuit means away from said output circuit means, and comprising,
   - a pair of oppositely poled diodes,
   - first circuit means for connecting one terminal of each diode to a circuit junction point between said input and output circuit means,
   - a pair of resistors, each having a terminal connected respectively to a respective other terminal of said diodes,
   - return circuit means connected to the respective other terminals of said resistors for forming a return path for tone signals,
   - bias means comprising a source of DC voltage connected to the junction point between one of said diodes and the respective resistor for establishing a DC bias on said diodes, thereby to determine the voltage at which said diodes start to conduct, and
   - a pair of shunting resistors connected respectively in shunt across said diodes, and being of value many times higher than said first-named pair of resistors.

2. Limiter in accordance with claim 1, wherein said first circuit means comprises capacitance means.

3. Limiter in accordance with claim 1, wherein said bias voltage is adjustable.

References Cited

UNITED STATES PATENTS

| | | | |
|---|---|---|---|
| 3,166,639 | 1/1965 | Babb | 307—237 |
| 3,188,554 | 6/1965 | Reid | 307—237 |

FOREIGN PATENTS

| | | |
|---|---|---|
| 985,945 | 3/1965 | Great Britain. |

DONALD D. FORRER, Primary Examiner

B. P. DAVIS, Assistant Examiner

U.S. Cl. X.R.

307—264, 318